United States Patent [19]

Iwamura

[11] Patent Number: 5,567,253
[45] Date of Patent: Oct. 22, 1996

[54] PNEUMATIC TIRE

[75] Inventor: Wako Iwamura, Kobe, Japan

[73] Assignee: Sumitomo Rubber Industries, Ltd., Kobe, Japan

[21] Appl. No.: 325,595

[22] Filed: Oct. 19, 1994

[30] Foreign Application Priority Data

Oct. 19, 1993 [JP] Japan .................. 5-285979

[51] Int. Cl.$^6$ .................. B60C 101/02; B60C 103/04; B60C 115/00
[52] U.S. Cl. .................. 152/209 R; 152/209 D
[58] Field of Search .................. 152/209 R, 209 A, 152/209 D

[56] References Cited

U.S. PATENT DOCUMENTS

| | | | |
|---|---|---|---|
| 2,224,141 | 12/1940 | Clark .................. | 152/209 R |
| 2,268,344 | 12/1941 | Shesterkin .................. | 152/209 R |
| 3,586,086 | 6/1971 | Boileau .................. | 152/209 R |
| 4,258,769 | 3/1981 | Makino et al. .................. | 152/209 R |
| 5,394,916 | 3/1995 | Williams .................. | 152/209 R |

FOREIGN PATENT DOCUMENTS

| | | |
|---|---|---|
| 0520755 | 12/1992 | European Pat. Off. . |
| 0524562 | 1/1993 | European Pat. Off. . |
| 2029844 | 12/1970 | Germany . |
| 726189 | 5/1932 | Japan .................. 152/209 R |
| 68406 | 3/1988 | Japan .................. 152/209 WT |
| 155808 | 6/1990 | Japan .................. 152/209 R |
| 74208 | 3/1991 | Japan .................. 152/209 R |
| 295706 | 12/1991 | Japan .................. 152/209 R |

OTHER PUBLICATIONS

Abstract of JP 63-68406(A).
Abstract of JP 2-155808(A).
Abstract of JP 3-295706(A).

*Primary Examiner*—Steven D. Maki

[57] ABSTRACT

A pneumatic tire provided with a tread portion having at least one circumferential groove with an axially inner groove wall and an axially outer groove wall. The radially outer edges of the axially inner and outer groove walls incline toward the tire equator. The axially inner groove wall intersects the tread face at an inclination angle of from 25 to 45 degrees with respect to the normal line to the tread face. The axially outer groove wall intersects the tread face at an inclination angle of from 0 to 20 degrees with respect to the normal line to the tread face. The tire design reduces running noise without deteriorating aquaplane resistance.

7 Claims, 3 Drawing Sheets

PNEUMATIC TIRE

FIELD OF THE INVENTION

The present invention relates to a pneumatic tire in which, by specifically limiting the inclination angles of the groove walls of a circumferential groove, a running noise is reduced without deteriorating the aquaplane resistance.

In recent years, along with the development of automobile technology, the speed-up and power-up capabilities of automobiles have advanced. To accommodate these advanced capabilities the tire aspect ratio is lowered. In such a low aspect ratio tire, as the ground contacting width becomes relatively large, running noise is liable to increase and an aquaplane phenomenon is liable to occur.

In general, a tire is provided with a tread portion having a plurality of wide grooves extending continuously in the tire circumferential direction.

When such a wide circumferential groove has axially inner and outer groove walls, conventionally the axially inner groove wall inclines towards the tire equator and the axially outer groove wall inclines towards the tread edge. Such a conventional circumferential groove design produces good drainage performance in the longitudinal direction, but also causes air resonance noise. This noise is generated from vibration of the air in a cavity formed between the circumferential groove and the road surface in the ground contacting patch during running. The frequency spectrum thereof has a maximum peak at a specific frequency, of which the wave length corresponds to twice the cavity length.

In the case of a passenger car tire, the maximum peak frequency is approximately 800 Hz to 1 kHz. The human ear is most sensitive to this frequency range. As a result the air resonance from the tire is a major source of automobile noise since the noise form other factors have been reduced nowadays.

If the volume of the circumferential groove is decreased, the resonance can be prevented and the noise can be reduced. However, reducing groove volume causes a decrease in the tires drainage performance that necessarily increases the possibility of the aquaplane phenomenon occuring.

SUMMARY OF THE INVENTION

It is therefore an object of the present invention to provide a pneumatic tire in which the running noise (coasting noise) especially the above-explained air resonance noise is reduced without deteriorating the tires aquaplane resistance.

According to one aspect of the present invention, a pneumatic tire comprises a tread portion, the tread portion provided with a circumferential groove having an axially inner groove wall and an axially outer groove wall, wherein the radially outer edges of the axially inner and outer groove walls incline toward the tire equator, and the axially inner groove wall intersects the tread face at an inclination angle of from 25 to 45 degrees with respect to a line normal to the tread face, and the axially outer groove wall intersects the tread face at an inclination angle of from 0 to 20 degrees with respect to a line normal to the tread face.

When running on a wet road, the water existing between the road surface and tread must be discharged through grooves. If not so, the water remains between the road surface and the tread elements such as block, rib and the like, and an aquaplane phenomenon is liable to occur.

In the above-mentioned conventional circumferential groove, the water existing in the tread central portion is liable to flow across the circumferential groove. The flow is an axially outward since the axially outward groove wall inclines towards the tread edge. In other words, the water remains between the road surface and the tread elements increasing the possibility of the aquaplane phenomenon occuring.

In contrast with the conventional groove, as the axially inner and outer groove walls according to the invention incline toward the tire equator, the axially outward water flow across the circumferential groove is decreased, and the occurence of aquaplane phenomenon is correspondingly decreased.

As compared with conventional grooves, the cross sectional area of the disclosed tire is decreased as shown in FIG. 3 by imaginary line 20. Therefore, the occurence of air resonance is decreased.

If the angle ($\beta$) is less than 0 degrees, that is, if the axially outer groove wall 7 inclines towards the tread edge, as explained above, aquaplaning is more likely to occur. If the angle ($\beta$) is larger than 20 degrees, the rigidity of the tread rubber around the groove edge portion is decreased, and uneven wear and tear-off is liable to occur.

If the above-mentioned angle ($\alpha$) is less than 25 degrees, water flow into the groove from the axially inside of the groove is hindered, and the water discharge is decreased. If the angle ($\alpha$) is more than 45 degrees, the water flowing in the groove is liable to flow towards axially inside. As a result, a water film is formed in the tread center portion which lowers the tires aquaplane resistance.

BRIEF DESCRIPTION OF THE DRAWINGS

An embodiment of the present invention will now be described in conjunction with the accompanying drawings, in which.

DETAILED DESCRIPTION OF PREFERRED EMBODIMENTS

Figure 1:
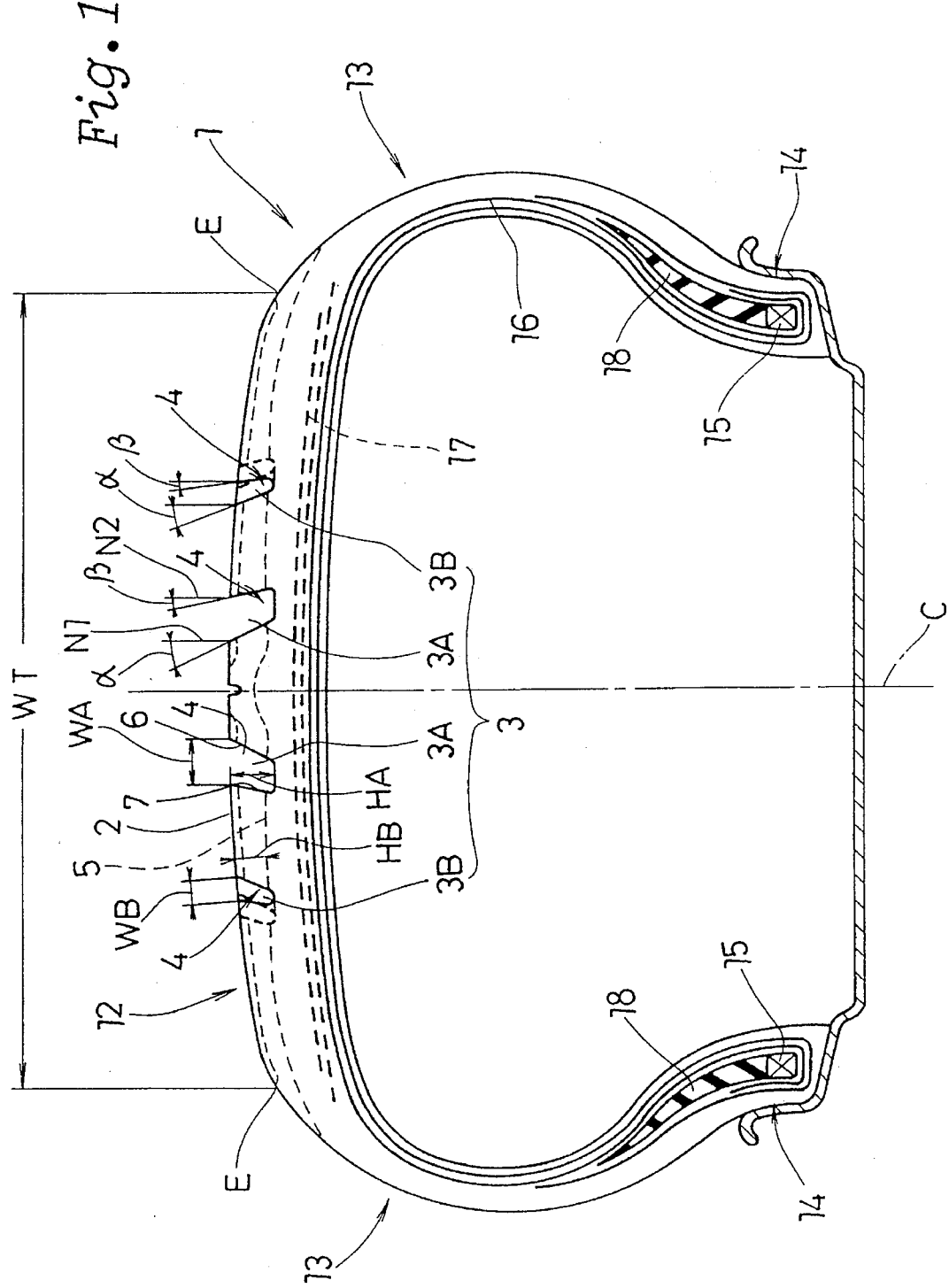
FIG. 1 is a cross sectional view of an embodiment of the present invention.
Figure 2:
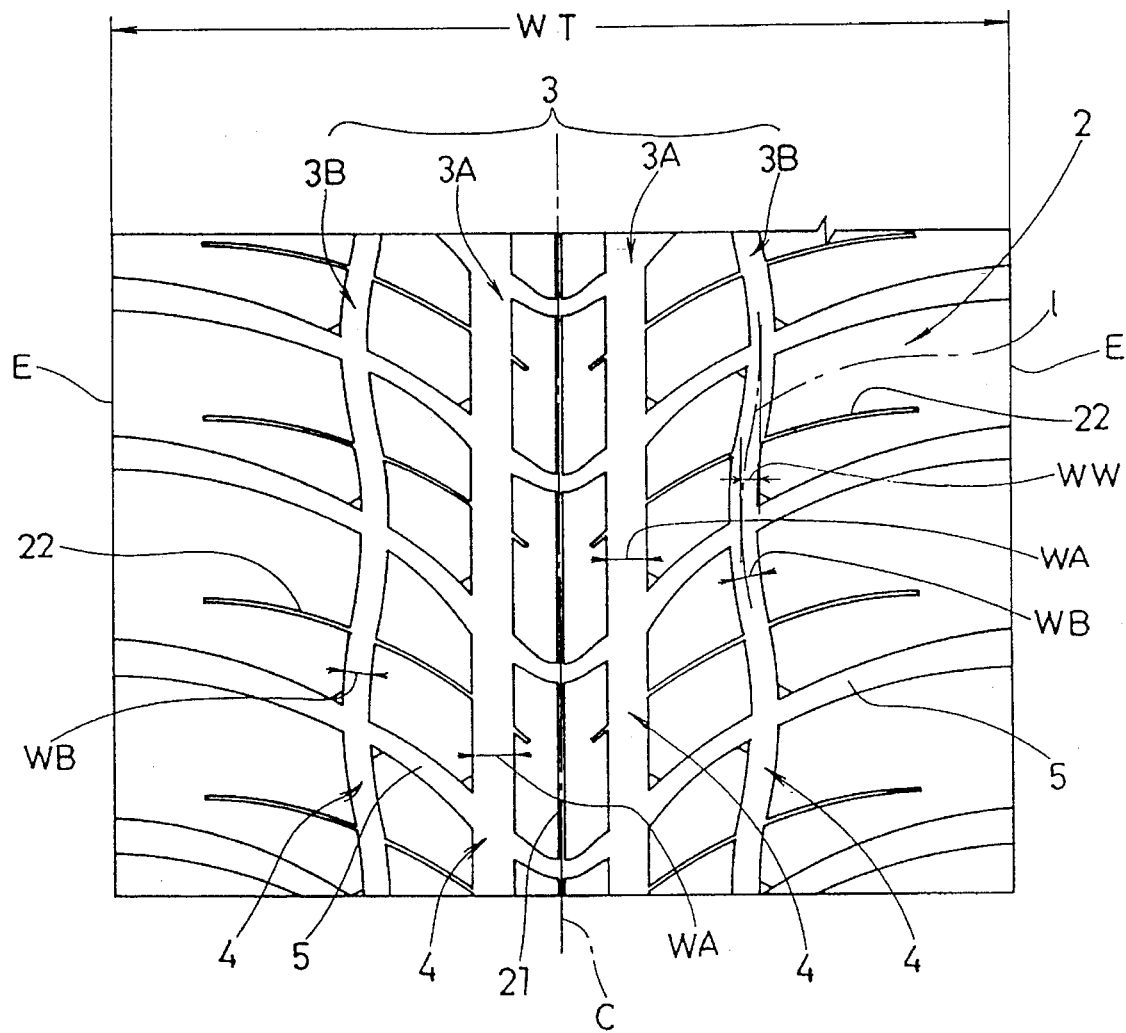
FIG. 2 shows an example of the tread pattern thereof.
Figure 3:
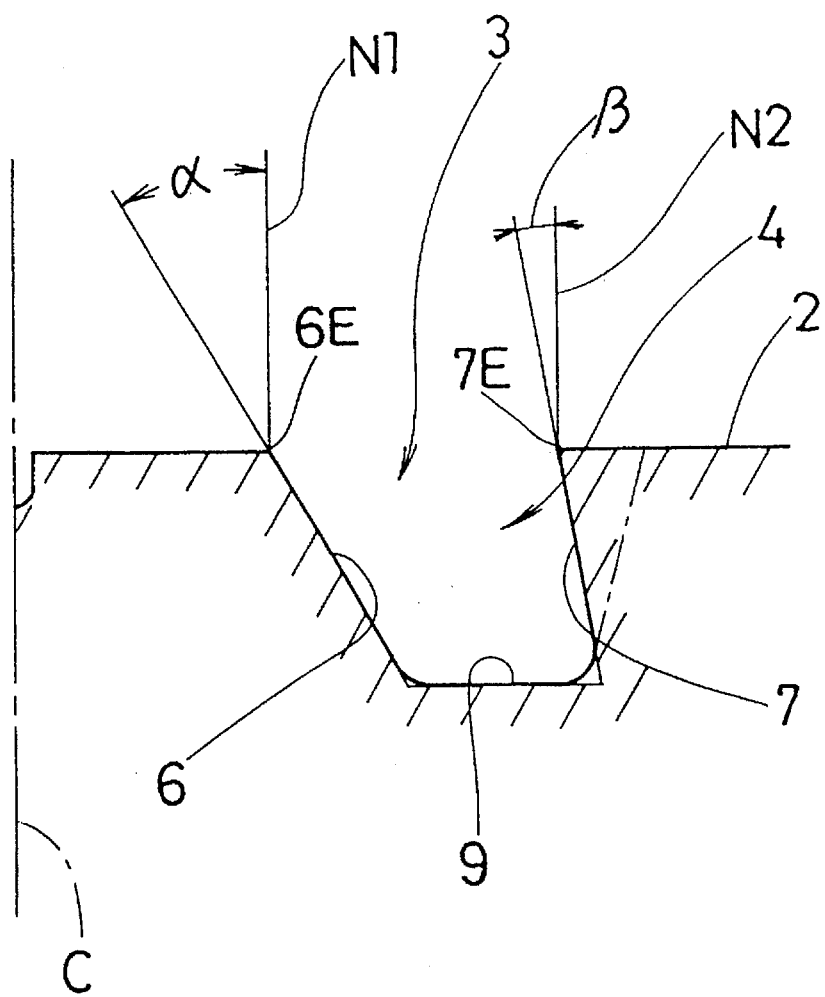
FIG. 3 is an enlarged cross sectional view of a circumferential groove.

In FIGS. 1 to 3, a pneumatic tire 1 is illustrated as having a tread portion 12 (the tread face 2 of which is convexly curved), a pair of axially spaced bead portions 14, a pair of sidewall portions 13 extending between the tread edges E and the bead portions 14, a pair of bead cores 15 disposed one in each of the bead portions 14, a carcass 16 extending between the bead portions 14 and turned up around the bead cores 15 from the axially inside to the outside thereof, a belt 17 disposed radially outside the carcass 16 and inside a rubber tread, and a bead apex 18 made of hard rubber disposed between the carcass main portion and each turned up portion and tapering radially outwardly from the bead core 15.

In this preferred embodiment, the tire 1 is a passenger radial tire, and the aspect ratio defined as the ratio of the tire section height to the the tire section width is 50%.

The carcass 16 includes two plies of cords arranged radially at an angle of from 75 to 90 degrees with respect to the tire equator C so that the cords in one ply cross the cords in the other ply. For the carcass cords, organic fiber cords, e.g. nylon, polyester, rayon and aromatic polyamide and the like can be used.

The belt 17 in this embodiment comprises a radially inner ply and a radially outer ply. Each ply is made of cords laid parallel to each other so that the cords in one ply cross the cords in the other ply. For the belt cords, steel cords or organic fiber cords, e.g., nylon, polyester, rayon, aromatic polyamide) and the like can be used.

The tread portion 12 is provided within the tread width WT with circumferential grooves 3 and axial grooves 5.

The circumferential grooves 3 extend continuously in the tire circumferential direction. Each groove has a depth of 0.08 to 0.16 times the tread width WT and a groove width of 0.06 to 0.12 times the tread width WT. The groove width is measured in the widthwise direction of the groove.

In FIG. 2, a pair of axially inner circumferential grooves 3A and a pair of axially outer circumferential grooves 3B are provided. The axially inner circumferential grooves 3A are a straight groove, but the axially outer circumferential grooves 3B are a wavy groove. Each of the axially inner circumferential grooves 3A is disposed on each side of the tire equator C. Each of the axially outer circumferential grooves 3B is disposed between one of the axially inner circumferential grooves 3A and one of the tread edges E. The paired circumferential grooves 3A, 3B are disposed symmetrically about the tire equator C with regard to the axial positions.

The groove depths HA and HB of the grooves 3A and have similar depths in the range of from 0.08 to 0.16 times the tread width WT.

The groove widths WA and WB of the grooves 3A and 3B, respectively are in the range of from 0.06 to 0.12 times the tread width WT, but the groove width WA is larger than the groove width WB.

Here, the tread width WT is between the tread edges E, that is, the maximum ground contacting width between the outermost axial edges E of the ground contacting region when the tire is mounted on its standard rim and inflated to its standard pressure, and then loaded with a standard load. The standard rim is a rim officially approved for the tire by, for example JATMA (Japan), TRA (USA), ETRTO (Europe) and the like, and the standard inner pressure and the standard load are the maximum air pressure and the maximum tire load for the tire officially specified in Air-pressure/Maximum-load Table by the same associations.

The peak-to-peak amplitude WW in the tire axial direction, of the center line (1) of the waved circumferential grooves 3B is in the range of from 0.5 to 1.5 times the groove width WB. The waved circumferential grooves 3B helps to control a side slippage occurs during cornering. Therefore, handling control maybe maintained in abnormal conditions by improving the cornering stability. This effect can not obtained, if the amplitude WW is smaller than 0.5 times the groove width WB. If the amplitude WW is larger than 1.5 times the groove width WB, the desired water drainage of the groove is decreased.

The above-mentioned axial grooves 5 are continuous from the axially innermost circumferential groove to the tread edge E. Preferably, the depth thereof is in the range of from 0.7 to 1.0 times that of the circumferential grooves 3.

In this embodiment, each of the axial grooves 5 extends continuously from one tread edge E to the other tread edge E, while intersecting all the circumferential grooves. As shown in FIG. 2, each axial groove 5 has an opened V-shape configuration, and all are arranged in the same direction. This V-shape configuration is rounded at the tire equator C rather than bent abruptly so that the portion between the axially inner circumferential grooves 3A has a concave curvature (in FIG. 2), and the axially outer groove portion between the axially inner circumferential grooves 3A and the tread edges E has a reverse convex curvature. Using such a configuration, water flow from the circumferential grooves 3A and 3B to the axial grooves 5 towards the tread edges E can be improved to increase aquaplane resistance.

In the example shown in FIG. 2, the tread pattern is symmetrical on both sides of the tire equator C. However, the tread pattern can be asymmetrical such that a right tread half shifts circumferentially from a left tread half by a half pitch of the axial grooves 5.

In FIG. 3 the axially inner and outer circumferential grooves 3A and 3B are also identified as inclining grooves 4. The term including groove means a groove having an axially inner groove wall 6 and an axially outer groove wall 7, in of which the radially outer edges 6E and 7E respectively are inclined towards the tire equator C.

The axially inner groove wall 6 intersects the tread face 2, defining the radially outer edge 6E. The inclination angle ($\alpha$) of the axially inner groove wall 6 with respect to the normal line N1 to the tread face 2 is in the range of from 25 to 45 degrees, preferably 28 to 35 degrees.

Further, the axially outer groove wall 7 intersects the tread face 2, defining the radially outer edge 7E.

The inclination angle ($\alpha$) of the axially outer groove wall 7 with respect to the normal line N2 to the tread face 2 is in the range of from 0 to 20 degrees, preferably 5 to 15 degrees.

Further, in this embodiment, a straight central circumferential groove 21 having a width and depth that are comparatively smaller than those of the circumferential grooves 3 is disposed on the tire equator C.

Secondary axial grooves 22 having a width and depth that are comparatively smaller than those of the above-mentioned axial grooves 5 are disposed between the axial grooves 5. Each secondary axial groove 22 extends from a position between the circumferential grooves 3A and 21 to a position between the circumferential groove 3B and the tread edge E while intersecting each of the circumferential grooves 3A and 3B.

As mentioned above, all of the circumferential grooves 3 may be inclining grooves, but, for example only the paired inner grooves, the paired outer grooves, or one of the inner and outer grooves can be inclining grooves.

Test tires of size 225/50R16 having the same construction and tread pattern as the tire shown in FIGS. 1 and 2 except for the groove wall inclinations were prepared and tested for the following performances.

1) Coasting noise

According to the coasting test procedure specified in Japanese JASO-C602, a 3000 cc 4WD passenger car provided with the test tires was coasted for 50 meters on a straight test course at a coasting speed of 35 kilometer/hour, and the maximum sound level in dB(A) of the passing noise was measured with a microphone set at 1.2 meter height and 7.5 meters sideways from the center line of the test course in the middle of the length thereof.

2) Pattern noise

Coasting the same test car at a speed of 100 kilometer/hour, the running noise heard in the inside of the car was evacuated and rated on a scale of 1 to 5. The higher the rank, the smaller the noise.

3) Aquaplane resistance

Turning the same test car on a wet road with a water depth of 6 or 7 mm at a speed of 80 kilometer/hour, the turning radius was gradually decreased to increase the lateral acceleration, and the critical lateral acceleration was measured as the lateral aquaplane resistance. The results are indicated by an index based on that the reference tire 1 is 100. The larger the index, the better the lateral aquaplane resistance.

The test results are shown in Table 1. As shown in Table 1, it was confirmed through the tests that the performance of the tires according to the present invention was superior to reducing reference tires in the running noise while maintaining aquaplane resistance.

TABLE I

|  | Ex. 1 | Ex. 2 | Ex. 3 | Ex. 4 | Ex. 5 | Ex. 6 | Ex. 7 | Ref. 1 | Ref. 2 | Ref. 3 | Ref. 4 | Ref. 5 |
|---|---|---|---|---|---|---|---|---|---|---|---|---|
| Inner wall angle (Alpha)/Outer-wall angle (Beta) *1 | | | | | | | | | | | | |
| Outer groove 3B | 30/0 | 30/0 | 30/10 | 16/−16 | 30/8 | 16/−16 | 16/−16 | 16/−16 | 0/−30 | 16/−16 | 8/−8 | 16/0 |
| Inner groove 3A | 30/0 | 30/0 | 30/10 | 30/8 | 16/−16 | 16/−16 | 30/8 | 16/−16 | 0/−30 | 16/−16 | 8/−8 | 16/0 |
| Inner groove 3A | 30/0 | 30/0 | 30/10 | 30/8 | 16/−16 | 30/8 | 16/−16 | 16/−16 | 0/−30 | 16/−16 | 8/−8 | 16/0 |
| Outer groove 3B | 30/0 | 30/0 | 30/10 | 16/−16 | 30/8 | 16/−16 | 16/−16 | 16/−16 | 0/−30 | 16/−16 | 8/−8 | 16/0 |
| Width WA (mm) | 10.5 | 9.5 | 10.5 | 10.5 | 10.5 | 10.5 | 10.5 | 10.5 | 10.5 | 11.5 | 10.5 | 10.5 |
| WIdth WB (mm) | 8.0 | 7.0 | 8.0 | 8.0 | 8.0 | 8.0 | 8.0 | 8.0 | 8.0 | 90 | 8.0 | 8.0 |
| Depth HA & HB (mm) | 8.0 | 8.0 | 8.0 | 8.0 | 8.0 | 8.0 | 8.0 | 8.0 | 8.0 | 8.0 | 8.0 | 8.0 |
| Test Result | | | | | | | | | | | | |
| Coasting noise dB(A) | 65.3 | 64.5. | 65.6. | 65.5 | 65.5 | 65.5 | 65.5 | 65.4 | 65.5 | 66.0 | 65.9 | 66.0 |
| Pattern noise | 3 | 3.5 | 3 | 3 | 3 | 3 | 3 | 3 | 3 | 2.5 | 2.5 | 2.5 |
| Aquaplane resistance | 106 | 101 | 108 | 104 | 104 | 102 | 102 | 100 | 96 | 103 | 104 | 106 |

*1) The minus sign of the outer-wall angle indicates that the wall inclines to the tread edge.

While the present invention has been described with the preferred embodiments and best mode defined, it should be understood that there may be other embodiments which fall within the spirit and scope of the inventions as defined by the following claims.

What is claimed is:

1. A pneumatic tire comprising:

a tread portion having tread edges, said tread portion provided with an axially inner straight circumferential groove and an axially outer wavy circumferential groove on each side of a tire equator, each of said axially inner straight circumferential grooves and axially outer wavy circumferential grooves having an axially inner groove wall and an axially outer groove wall that radially extends from a groove bottom to a tread face;

each of the axially inner and outer groove walls being inclined toward the tire equator so that a radially outer edge of each groove wall at the tread face is located axially inward of the radially inner edge of each groove wall at the groove bottom;

each of the axially inner groove walls intersecting the tread face at an inclination angle in the range of from 25 to 45 degrees with respect to a line normal to the tread face, each of the axially outer groove walls intersecting the tread face at an inclination angle in the range of from 0 to 20 degrees with respect to a line normal to the tread face; and a plurality of axial grooves for channelling water from the circumferential grooves toward the tread edges to increase aquaplane resistance, each axial groove having an open v-shaped configuration, extending continuously across the tread portion between the tread edges and intersecting the axially inner straight circumferential grooves and the axially outer wavy circumferential grooves.

2. The pneumatic tire according to claim 1, wherein said tread portion further comprises a straight circumferential groove on the tire equator.

3. The pneumatic tire according to claim 1, wherein said tread portion is provided with no other circumferential groove other than said axially inner straight circumferential groove and said axially outer wavy circumferential groove on each side of the tire equator.

4. The pneumatic tire according to claim 1, wherein the angle of inclination of each of said axially inner groove walls is in the range from 28 to 35 degrees.

5. The pneumatic tire according to claim 1, wherein the angle of inclination of said each of axially outer groove walls is in the range from 5 to 15 degrees.

6. A pneumatic tire as recited in claim 1, each of the axial grooves including, a middle portion that is concave shaped with respect to the tire rotational direction, and two outer portions extending from the middle portion that are convex shaped with respect to the tire rotational direction.

7. A pneumatic tire as recited in claim 6 wherein the middle portion of each of the plurality of axial grooves is located between the axially inner straight circumferential grooves.

* * * * *